United States Patent
Diao et al.

(10) Patent No.: US 10,185,023 B2
(45) Date of Patent: Jan. 22, 2019

(54) METHOD, SYSTEM, AND PROCESSING SERVER FOR DETERMINING TRACK INFORMATION OF TARGET PERSON

(71) Applicant: Hangzhou Hikvision Digital Technology Co., Ltd., Hangzhou (CN)

(72) Inventors: Yiping Diao, Hangzhou (CN); Lifeng Yu, Hangzhou (CN)

(73) Assignee: HANGZHOU HIKVISION DIGITAL TECHNOLOGY CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 15/573,519

(22) PCT Filed: May 10, 2016

(86) PCT No.: PCT/CN2016/081596
§ 371 (c)(1),
(2) Date: Nov. 13, 2017

(87) PCT Pub. No.: WO2016/180324
PCT Pub. Date: Nov. 17, 2016

(65) Prior Publication Data
US 2018/0120408 A1    May 3, 2018

(30) Foreign Application Priority Data

May 12, 2015 (CN) .......................... 2015 1 0241202
Jun. 5, 2015 (CN) .......................... 2015 1 0308669

(51) Int. Cl.
*H04N 7/18* (2006.01)
*G01S 3/786* (2006.01)
(Continued)

(52) U.S. Cl.
CPC ............ *G01S 3/7864* (2013.01); *G06F 17/30* (2013.01); *G06T 7/20* (2013.01); *G06T 7/292* (2017.01);
(Continued)

(58) Field of Classification Search
CPC ........ G01S 3/7864; G06F 17/30; G06F 17/20; G06F 17/292; H04L 61/6022; H04N 7/18; H04N 7/181
(Continued)

(56) References Cited

U.S. PATENT DOCUMENTS 9,453,904 B2    9/2016  Moshfeghi
2005/0219375 A1  10/2005  Hasegawa et al.
(Continued)

FOREIGN PATENT DOCUMENTS

CN    101325694 A    12/2008
CN    20243552 U    9/2012
(Continued)

OTHER PUBLICATIONS

International Search Report and English translation for PCT/CN2016/081596, dated Jun. 28, 2016 (4 pgs.).
(Continued)

*Primary Examiner* — Robert Chevalier
(74) *Attorney, Agent, or Firm* — Shumaker, Loop & Kendrick, LLP

(57) ABSTRACT

Embodiments of the present application disclose a method, a system and a processing server for determining track information of a target person. The method comprises: obtaining a plurality of designated videos; determining a plurality of first image acquisition devices shot the designated videos; according to a preset intersection mode and for the first image acquisition devices: obtaining sets of unique identification information detected by WiFi detectors of the
(Continued)

first image acquisition devices during a detection time interval respectively, and performing an intersection processing on the obtained sets of unique identification information to obtain an intersection set of unique identification information; determining the unique identification information of the WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected. In the embodiments of the present application, it does not need to analyze a large number of videos.

14 Claims, 3 Drawing Sheets

(51) Int. Cl.
    *G06T 7/292*      (2017.01)
    *H04L 29/12*      (2006.01)
    *G06F 17/30*      (2006.01)
    *G06T 7/20*       (2017.01)
(52) U.S. Cl.
    CPC ............ *H04L 61/6022* (2013.01); *H04N 7/18* (2013.01); *H04N 7/181* (2013.01); *G06T 2207/10016* (2013.01); *G06T 2207/30196* (2013.01)

(58) Field of Classification Search
    USPC ........ 348/159, 143, 153, 161; 386/223, 224, 386/226
    See application file for complete search history.

(56) References Cited

U.S. PATENT DOCUMENTS

| | | | |
|---|---|---|---|
| 2007/0257985 A1 | 11/2007 | Estevez et al. | |
| 2013/0234932 A1* | 9/2013 | Imai | G06F 3/005 345/156 |
| 2015/0363638 A1* | 12/2015 | Takahashi | G06K 9/00369 382/103 |

FOREIGN PATENT DOCUMENTS

| | | |
|---|---|---|
| CN | 103379307 A | 10/2013 |
| CN | 104092974 A | 10/2014 |
| EP | 2280382 A1 | 2/2011 |
| WO | 2014189406 A1 | 11/2014 |

OTHER PUBLICATIONS

Jianming Lv et al., "Identify and Trace Criminal Suspects in the Crowd Aided by Fast Trajectories Retrieval", DASFAA, Part II, LNCS 8422, p. 16-30, (2014).

European Search Report for EP Appln. No. 16792174.1, dated Oct. 18, 2018 (11 pages).

* cited by examiner

METHOD, SYSTEM, AND PROCESSING SERVER FOR DETERMINING TRACK INFORMATION OF TARGET PERSON

The present application claims the priority to a Chinese Patent Application No. 201510308669.1, filed with State Intellectual Property Office of People's Republic of China on Jun. 5, 2015 and entitled "Method, System and Processing server for determining track information of a target person", and the priority to a Chinese Patent Application No. 201510241202.X, filed with State Intellectual Property Office of People's Republic of China on May 12, 2015 and entitled "Method, Device and System for determining a track of a target object", which are incorporated herein by reference in their entireties.

TECHNICAL FIELD

The present application relates to the field of communication technology, and particularly to a method, a system and a processing server for determining track information of a target person.

BACKGROUND

When tracing a person based on videos, what is really of interest is to trace a track of a target person, i.e., to obtain track information of a target person. In order to obtain track information of a target person, all videos containing the target person need to be obtained, and it is possible to determine the track information of the target person and implement the track tracing of a target person based on locations of image acquisition devices that acquire these videos.

However, in above methods, it is needed to analyze a large number of videos to analyze whether the large number of videos contain a target person, thus the analysis process is time-consuming, laborious, and very complex.

CONTENTS OF THE INVENTION

Embodiments of the present application disclose a method, a system and a processing server for determining track information of a target person, so as to avoid analyzing a large number of videos.

To achieve the above objective, embodiments of the present application disclose the following technical solutions.

Embodiments of the present application disclose a method for determining track information of a target person, which is applicable to a processing server, the processing server is connected with a plurality of image acquisition devices including wireless fidelity WiFi detectors;

the method includes:
 obtaining a plurality of designated videos that contain a target person;
 determining a plurality of first image acquisition devices shot the designated videos;
 according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information intersection;
 determining the unique identification information of the WiFi terminal in the intersection set of unique identification information as unique identification information of the target person;
 obtaining image acquisition devices in which all WiFi detectors detected the unique identification information of the target person are located;
 determining track information of the target person based on locations of the image acquisition devices in which all the WiFi detectors are detected.

Embodiments of the present application disclose a processing server, which is connected with a plurality of image acquisition devices including WiFi detectors, the processing server specifically includes:
 an interface module, used for obtaining a plurality of designated videos that contain a target person;
 a data processor, used for determining a plurality of first image acquisition devices shot the designated videos; according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information;
 determining the unique identification information of the WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected.

Embodiments of the present application disclose a method for determining track information of a target person, which is applicable to a system including a processing server and a plurality of image acquisition devices connected with the processing server, and the image acquisition devices contain wireless fidelity WiFi detectors therein; the method includes:
 capturing and outputting videos by image acquisition devices;
 detecting unique identification information of WiFi terminals by WiFi detectors within their detection areas and outputting a correspondence relationship between the detected unique identification information and the detection moment of the unique identification information;
 obtaining a plurality of designated videos that contain a target person by the processing server based on the videos; determining a plurality of first image acquisition devices shot the designated videos; according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively based on the correspondence relationship between the unique identification information and the detection moment of the unique identification information, and performing an intersection processing on the obtained sets of unique identification information of the WiFi terminals to obtain an intersection set of unique identification information; determining the unique identification information of the WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected.

Embodiments of the present application disclose a system for determining track information of a target person, which specifically includes a processing server and a plurality of image acquisition devices connected with the processing server, and the image acquisition devices contain wireless fidelity WiFi detectors therein; wherein, the image acquisition devices are used for capturing and outputting videos;

WiFi detectors are used for detecting unique identification information of WiFi terminals within their detection areas and outputting a correspondence relationship between the detected unique identification information and the detection moment of the unique identification information;

the processing server is used for obtaining a plurality of designated videos that contain a target person based on the videos; determining a plurality of first image acquisition devices shot the designated videos; according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively based on the correspondence relationship between the unique identification information and the detection moment of the unique identification information, and performing an intersection processing on the obtained sets of unique identification information of the WiFi terminals to obtain an intersection set of unique identification information; determining the unique identification information of the WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected.

Embodiments of the present application disclose an application program, which is used to perform the method for determining track information of a target person described above when in operation.

Embodiments of the present application disclose a storage medium, which is used for storing an application program that is used to perform the method for determining track information of a target person described above.

Based on the above technical solutions, compared to the prior art, embodiments of the present application at least provide the following advantages: in the embodiments of the present application, it is possible to determine unique identification information of a target person based on a plurality of designated videos containing the target person (i.e., a part of videos among all videos containing the target person, which can be designated by users), obtain image acquisition devices in which all WiFi (Wireless Fidelity) detectors detected the unique identification information of the target person are located, and determine track information of the target person based on locations of the image acquisition devices in which all the WiFi detectors are detected. In the above solution, track information of a target person can be obtained after simply obtaining only a small number of videos containing the target person, eliminating analysis processes on a large number of videos.

BRIEF DESCRIPTION OF THE DRAWINGS

In order to describe the embodiments of the present application and the technical solutions in the prior art more clearly, drawings required to be used in embodiments and the prior art will be described briefly below. It is obvious that the drawings below are only some embodiments of the present application, and those skilled in the art can also obtain further drawings based on these drawings without any creative efforts.

SPECIFIC MODE FOR CARRYING OUT THE INVENTION

In order to make the objections, technical solutions as well as advantages of the present application more clear and understandable, the present application will be described in more detail below with reference to the appended drawings and embodiments. Obviously, the described embodiments are only some of the embodiments of the present application, rather than all of the embodiments. All other embodiments obtained based on the embodiments of the present application by those skilled in the art without any creative efforts fall into the protection scope defined by the present application.

The First Embodiment

Figure 1:
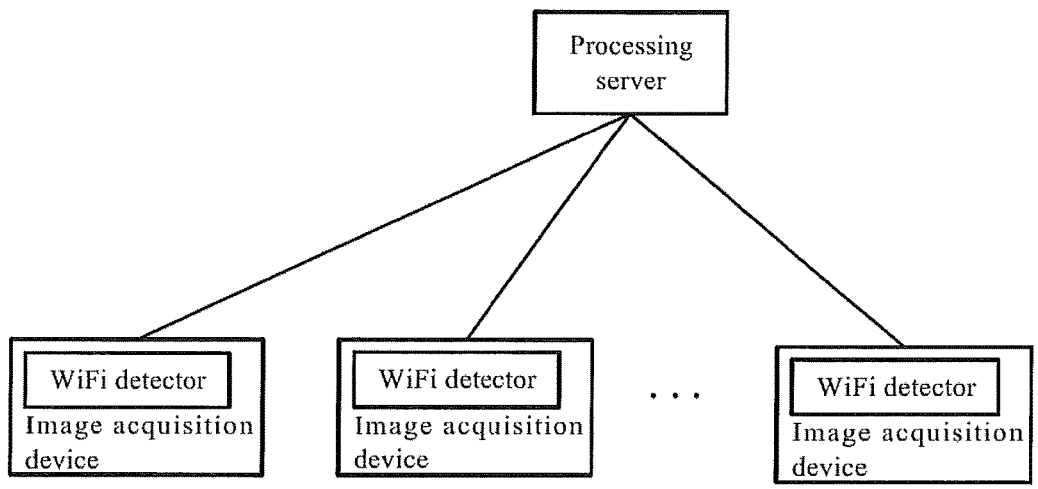
FIG. 1 is a schematic structural diagram of a system for determining track information of a target person presented in a first embodiment of the present application.

The first embodiment of the present application proposes a system for determining track information of a target person as shown in FIG. 1, the system can specifically include a processing server and a plurality of image acquisition devices connected with the processing server. The processing server is connected with a plurality of image acquisition devices in a wired mode or in a wireless mode. Each image acquisition device contains a WiFi detector and an image capturing module (e.g., an intelligent camera with an image capturing function) therein. The image acquisition device captures videos via the image capturing module. The WiFi detector can be a WiFi detector built in an image acquisition device, and can also be a WiFi detector deployed separately from an image acquisition device. For ease of description, a WiFi detector built in an image acquisition device is taken as an example in embodiments of the present application. Based on this WiFi detector, an image acquisition device, after receiving a WiFi signal (which can be a broadcast message) from a WiFi terminal, can parse out unique identification information of the WiFi terminal from this WiFi signal. The unique identification information of the WiFi terminal specifically includes but not limited to a Media Access Control (MAC) address of the WiFi terminal. Further, based on this WiFi detector, the image acquisition device, after receiving a WiFi signal from a WiFi terminal, may not response to the WiFi terminal and not provide WiFi services for the WiFi terminal, as long as it can parse out the unique identification information of the WiFi terminal carried in this WiFi signal.

The image acquisition devices are used for capturing and outputting videos.

The WiFi detectors are used for detecting unique identification information of a WiFi terminal within their detection areas and outputting a correspondence relationship between the detected unique identification information and a detection moment of the unique identification information.

The processing server is used for obtaining a plurality of designated videos that contain the target person based on the videos output by the image acquisition devices; determining a plurality of first image acquisition devices shot the designated videos; according to a preset intersection mode and for at least two first image acquisition devices among the plurality of first image acquisition devices: obtaining appearance moments of the target person in the designated videos respectively, determining a detection moment interval containing these appearance moments respectively, obtaining sets of unique identification information of WiFi terminals detected by the WiFi detectors of the first image acquisition devices during the detection moment interval respectively based on the correspondence relationship, output by the WiFi detectors, between the unique identification information and the detection moment of the unique identification information, and performing an intersection processing on the obtained sets of unique identification information of the WiFi terminals to obtain a intersection set of the unique identification information; determining the unique identification information of the WiFi terminal in the intersection set of the unique identification information as unique identification information of the target person; obtaining the image acquisition devices in which all WiFi detectors detected the unique identification information of the target person are located; determining the track information of the target person based on the locations of the image acquisition devices in which all the WiFi detectors are detected.

Figure 2:
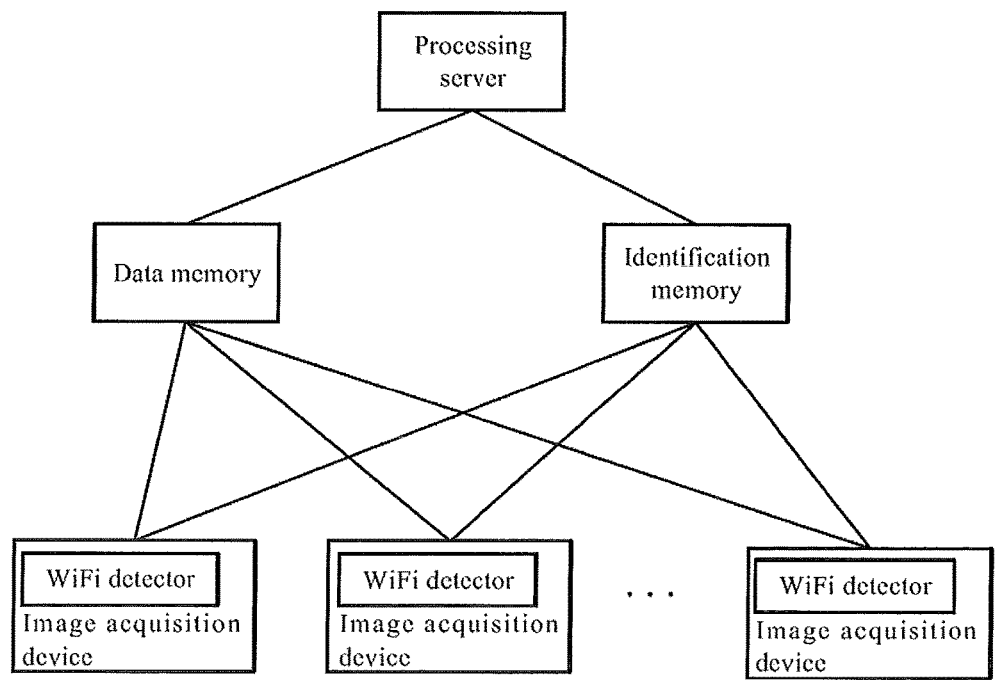
FIG. 2 is a schematic structural diagram of a system for determining track information of a target person presented in a first embodiment of the present application.

The image acquisition devices are specifically used for, when outputting videos, directly outputting these videos to the processing server. The processing server is specifically used for directly obtaining a plurality of designated videos that contain the target person from this processing server based on the videos output by the image acquisition devices to this processing server. Alternatively, as a schematic structural diagram of a system shown in FIG. 2, the system can further include a video memory. Based on this, the image acquisition devices are specifically used for, when outputting videos, outputting these videos to the video memory. The video memory is used for receiving the videos from the image acquisition devices and storing these videos in a local storage medium. The processing server is specifically used for obtaining a plurality of designated videos that contain the target person from the video memory based on the videos output by the image acquisition devices to the video memory.

The WiFi detectors are specifically used for, when outputting a correspondence relationship between the detected unique identification information and the detection moment of the unique identification information, directly outputting the correspondence relationship between the detected unique identification information and the detection moment of the unique identification information to the processing server. Further, the processing server is specifically used for directly obtaining a correspondence relationship between the unique identification information and the detection moment of the unique identification information from this processing server based on the correspondence relationship, output by WiFi detectors to this processing server, between the unique identification information and the detection moment of the unique identification information, and obtaining sets of unique identification information of WiFi terminals detected by the WiFi detectors during the detection moment interval based on this correspondence relationship. Alternatively, as a schematic structural diagram of a system shown in FIG. 2, the system can further include an identification memory. Based on this, the WiFi detectors are specifically used for, when outputting a correspondence relationship between the unique identification information and the detection moment of the unique identification information, outputting the correspondence relationship between the unique identification information and the detection moment of the unique identification information to the identification memory. The identification memory is used for receiving and storing the correspondence relationship between the unique identification information and the detection moment of the unique identification information from the WiFi detectors. The processing server is specifically used for directly obtaining a correspondence relationship between the unique identification information and the detection moment of the unique identification information from the identification memory based on the correspondence relationship, output by WiFi detectors to the identification memory, between the unique identification information and the detection moment of the unique identification information, and obtaining sets of unique identification information of WiFi terminals detected by the WiFi detectors during the detection time interval based on this correspondence relationship.

In embodiments of the present application, a video memory and an identification memory can be deployed in one device, and can also be deployed in different devices.

In embodiments of the present application, the WiFi terminal can specifically be a mobile terminal provided with a WiFi module, and the WiFi module can be a WiFi module at a user's side, such as a general WiFi module used in a mobile terminal, a laptop computer, and a tablet computer etc. Based on this WiFi module, a WiFi terminal periodically sends a WiFi signal (i.e., broadcast message, including but not limited to Beacon frames), which carries unique identification information of this WiFi terminal. When a target person moves with this WiFi terminal, if the target person is located within a capturing area of a certain image acquisition device, videos captured by this image acquisition device will contain the target person. If the WiFi terminal carried by the target person is located within a WiFi detection area of the WiFi detector of this image acquisition device, the WiFi detector can detect the unique identification information of this WiFi terminal, and record a correspondence relationship between the unique identification information and the detection moment of the unique identification information. The WiFi terminal carried by a target person can periodically send a WiFi signal, while the WiFi detector can periodically detect the WiFi signal from the WiFi terminal, and parse out unique identification information of the WiFi terminal from this WiFi signal. Based on this, when a WiFi terminal is located within a WiFi detection area of a WiFi detector, the WiFi detector can detect unique identification information of this WiFi terminal, and record a correspondence relationship between the unique identification information of this currently detected WiFi terminal and the detection moment of the unique identification information.

For example, at a detection moment 1 of a WiFi detector 1 of an image acquisition device 1, if a WiFi terminal 1 is located within a WiFi detection area of the WiFi detector 1, the WiFi detector 1 can detect unique identification information of the WiFi terminal 1, and record a correspondence relationship between the unique identification information of the WiFi terminal 1 and the detection moment 1.

It should be noted that, at the same detection moment of a WiFi detector, there may be a plurality of WiFi terminals located within a WiFi detection area of the WiFi detector, this WiFi detector can detect unique identification information of a plurality of WiFi terminals, and record correspondence relationships between the unique identification information of the plurality of WiFi terminals and this detection moment. For example, at a detection moment 1 of a WiFi detector 1, if a WiFi terminal 1, a WiFi terminal 2 and a WiFi terminal 3 are all located within a WiFi detection area of the WiFi detector 1, the WiFi detector can detect unique identification information of the WiFi terminal 1, unique identification information of the WiFi terminal 2 and unique identification information of the WiFi terminal 3, and record correspondence relationships between the unique identification information of the WiFi terminal 1, the unique identification information of the WiFi terminal 2, the unique identification information of the WiFi terminal 3 and the detection moment 1.

In embodiments of the present application, a user can know which videos contain a target person, and designate information of the videos containing the target person to a processing server, the processing server can obtain a plurality of designated videos containing the target person based on the information of the videos containing the target person designated by the user. The user only needs to select a part of videos from all videos containing the target person, and designate a plurality of videos of this part containing the target person to the processing server. For example, when a user designates a video 1, a video 2, a video 3 and a video 4 that contain a target person to a processing server, videos containing the target person obtained by the processing server are the video 1, the video 2, the video 3 and the video 4. Further, when image acquisition devices output videos, they can also output a correspondence relationship between the identifications of the image acquisition devices and these videos, such that the processing server can know various first image acquisition devices corresponding to various videos containing a target person. For example, the processing server knows a first image acquisition device 1 corresponding to the video 1, a first image acquisition device 2 corresponding to the video 2, a first image acquisition device 3 corresponding to the video 3, a first image acquisition device 4 corresponding to the video 4.

In embodiments of the present application, the processing server, according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively based on the correspondence relationship, output by the WiFi detectors, between the unique identification information and the detection moment of the unique identification information, and performing an intersection processing on the obtained sets of unique identification information of the WiFi terminals to obtain an intersection set of the unique identification information, can specifically include but is not limited to the following two cases:

case 1: the processing server is specifically used for, when the preset intersection mode is to get an intersection set of all sets, for all first image acquisition devices of the plurality of first image acquisition devices (a plurality of first image acquisition devices corresponding to a plurality of designated videos containing the target person): obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the sets of unique identification information of the WiFi terminals respectively obtained by all first image acquisition devices among the plurality of first image acquisition devices, so as to obtain an intersection set of the unique identification information;

case 2: the processing server is specifically used for, when the preset intersection mode is to get an intersection set cyclically, A, selecting two first image acquisition devices from the plurality of first image acquisition devices (a plurality of first image acquisition devices corresponding to a plurality of designated videos containing the target person), obtaining appearance moments of the target person in the designated videos respectively, determining a detection time interval containing these appearance moments respectively, and obtaining sets of unique identification information of WiFi terminals detected by the WiFi detectors of the first image acquisition devices during the detection time interval respectively; B, performing an intersection processing on the sets of unique identification information of the WiFi terminals respectively obtained by the two first image acquisition devices among the plurality of first image acquisition devices, so as to obtain a first intersection set of unique identification information; C, judging whether the number of pieces of the unique identification information of the WiFi terminals in the first intersection set of unique identification information equals to 1; if so, determining this first intersection set of unique identification information as a final intersection set of unique identification information, and ending this flow; otherwise, performing step D; D, selecting one unselected first image acquisition device from the plurality of first image acquisition devices, obtaining appearance moments of the target person in the designated videos, determining a detection time interval containing these appearance moments, obtaining a set of unique identification information of the WiFi terminals detected by the WiFi detector of the first image acquisition device during the detection time interval; E, performing an intersection processing on the set of unique identification information of the WiFi terminals obtained by this first image acquisition device and the first intersection set of unique identification information, and judging whether the number of pieces of the unique identification information of the WiFi terminal in the intersection set obtained after the intersection processing equals to 1; if so, determining the intersection set obtained after the intersection processing as the final intersection set of unique identification information; otherwise, determining the intersection set obtained after the intersection processing as the first intersection set of unique identification information, and performing D.

In embodiments of the present application, since videos contain a target person, a processing server can directly determine appearance moments of the target person in these videos. After determining the appearance moments of the target person in the videos, the processing server can further determine a detection time interval containing these appearance moments. The detection time interval can specifically be from the appearance moment to a sum of the appearance moment and a first value, or from a difference of the appearance moment and a second value to the appearance moment, or from a difference of the appearance moment and a third value to a sum of the appearance moment and a fourth value. In actual applications, all of the first, second, third and fourth values can be arbitrarily selected according to actual experience. For example, when an error between the detection moment and the appearance moment allowable in actual applications is no larger than one second, the detection time interval can be from a difference of the appearance moment and one second to a sum of the appearance moment and one second. For example, when the appearance moment is 17:30:00 on May 28, 2015, a corresponding detection time interval is from 17:29:59 on May 28, 2015 to 17:30:01 on May 28, 2015.

In embodiments of the present application, a processing server can obtain sets of unique identification information of WiFi terminals detected by WiFi detectors of first image acquisition devices during a detection time interval based on a correspondence relationship between the unique identification information output by the WiFi detectors of the first image acquisition devices and the detection moments of the unique identification information. For example, a processing server can know whether a detection moment of each piece of unique identification information output by a WiFi detector 1 is located within a detection time interval based on a correspondence relationship between the unique identification information output by the WiFi detector 1 of a first image acquisition device 1 and the detection moment of the unique identification information as well as the detection time interval; if it is located within the detection time interval, a set of unique identification information contain this piece of unique identification information; otherwise, the set of unique identification information does not contain this piece of unique identification information.

For case 1, when a plurality of first image acquisition devices are first image acquisition devices 1, 2, 3 and 4 respectively, a set 1 of unique identification information of WiFi terminals detected by a WiFi detector of the first image acquisition device 1 during a detection time interval, a set 2 of unique identification information of WiFi terminals detected by a WiFi detector of the first image acquisition device 2 during the detection time interval, a set 3 of unique identification information of WiFi terminals detected by a WiFi detector of the first image acquisition device 3 during the detection time interval, a set 4 of unique identification information of WiFi terminals detected by a WiFi detector of the first image acquisition device 4 during the detection time interval are obtained respectively, and performing an intersection processing on the sets 1, 2, 3 and 4 so as to obtain a intersection set of unique identification information.

For case 2, when a plurality of first image acquisition devices are first image acquisition devices 1, 2, 3 and 4 respectively, a set 1 of unique identification information of WiFi terminals detected by a WiFi detector of the first image acquisition device 1 during a detection time interval, a set 2 of unique identification information of WiFi terminals detected by a WiFi detector of the first image acquisition device 2 during the detection time interval are obtained respectively, and performing an intersection processing on the sets 1, 2 so as to obtain a first intersection set of unique identification information. If the number of pieces of the unique identification information of WiFi terminals in the first intersection set of unique identification information equals to 1, the first intersection set of unique identification information is determined as a final intersection set of unique identification information. If the number of pieces of the unique identification information of WiFi terminals in the first intersection set of unique identification information does not equal to 1, a set 3 of unique identification information of WiFi terminals detected by a WiFi detector of the first image acquisition device 3 is obtained during the detection time interval, and an intersection processing is performed on the set 3 and the first intersection set of unique identification information, if the number of pieces of the unique identification information of WiFi terminals in the intersection set obtained after the intersection processing equals to 1, determining the intersection set obtained after the intersection processing as a final intersection set of unique identification information; if the number of pieces of the unique identification information of WiFi terminals in the intersection set obtained after the intersection processing does not equal to 1, determining the intersection set obtained after the intersection processing as the first intersection set of unique identification information, and so on.

In embodiments of the present application, a processing server can obtain image acquisition devices in which all WiFi detectors detected unique identification information of the target person are located based on a correspondence relationship between the unique identification information and the detection moment of the unique identification information output by all WiFi detectors, and determine track information of the target person based on locations of image acquisition devices in which all the WiFi detectors are detected. For example, when the correspondence relationship between unique identification information and the detection moment of the unique identification information output by WiFi detectors 1 to 15 includes the unique identification information 1 of a target person, a processing server can obtain that all WiFi detectors which can detect the unique identification information 1 are WiFi detectors 1 to 15, and determine the track information of the target person based on the locations of image acquisition devices where WiFi detectors 1 to 15 are located.

In a specific application, the track information of a target person determined by a processing server based on a correspondence relationship between the unique identification information and the detection moment of the unique identification information output by WiFi detectors is initial track information, which can be corrected subsequently so as to obtain final track information. When correcting the initial track information, it is possible to determine an initial WiFi detector and a terminated WiFi detector for the track, determine a first detection moment when the initial WiFi detector detects unique identification information of a target person, and determine a second detection moment when the terminated WiFi detector detects the unique identification information of the target person. For other WiFi detectors in the initial track information, if detection moments when other WiFi detectors detect the unique identification information of the target person are between the first detection moment and the second detection moment, locations of image acquisition devices where other WiFi detectors are located are reserved in the final track information; otherwise, the locations of image acquisition devices where other WiFi detectors are located are deleted from the final track information. The final track information can be obtained after performing the above processing on each of other WiFi detectors. The initial WiFi detector and the terminated WiFi detector for the track can be decided by users.

Based on the above technical solutions, compared to the prior art, embodiments of the present application at least have the following advantages: in the embodiments of the present application, by associating information output by video monitors and information output by WiFi detectors, it is possible to determine unique identification information of a target person based on a plurality of designated videos containing the target person (i.e., a part of videos among all videos containing the target person, which can be designated by users), obtain image acquisition devices in which all WiFi detectors detected the unique identification information of the target person are located, and determine the track information of the target person based on locations of the image acquisition devices in which all the WiFi detectors are detected. In the above solution, track information of a target person can be obtained after simply obtaining only a small number of videos containing the target person without analyzing a large number of videos, eliminating analysis processes on a large number of videos.

The Second Embodiment

Figure 3:
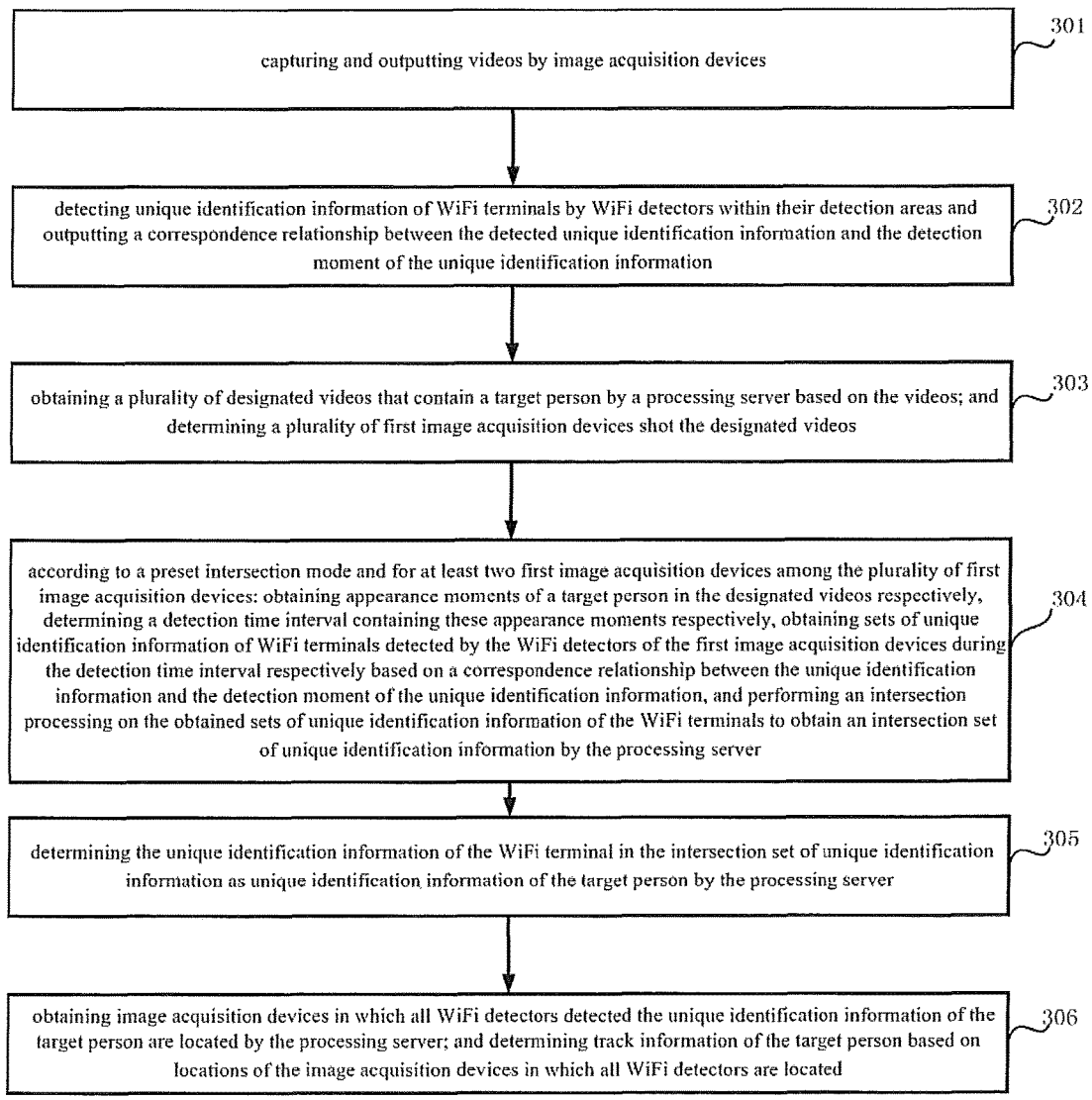
FIG. 3 is a schematic flowchart of a method for determining track information of a target person presented in a second embodiment of the present application.

Based on the same inventive concept as the above system, the second embodiment of the present application proposes a method for determining track information of a target person, which is applicable to a system including a processing server and a plurality of image acquisition devices connected with the processing server. The processing server is connected with a plurality of image acquisition devices in a wired mode or in a wireless mode. Each image acquisition device contains a WiFi detector and an image capturing module (e.g., an intelligent traffic camera with an image capturing function) therein. The image acquisition device captures videos via the image capturing module. The WiFi detector can be a WiFi detector built in an image acquisition device, and can also be a WiFi detector deployed separately from an image acquisition device. For ease of description, a WiFi detector built in an image acquisition device is taken as an example. Based on this WiFi detector, an image acquisition device, after receiving a WiFi signal (which can be a broadcast message) from a WiFi terminal, can parse out unique identification information of the WiFi terminal from this WiFi signal, and the unique identification information of the WiFi terminal specifically including but not limited to a MAC address of the WiFi terminal. Further, based on this WiFi detector, the image acquisition device, after receiving a WiFi signal from a WiFi terminal, may not response to the WiFi terminal and not provide WiFi services for the WiFi terminal, as long as it can parse out the unique identification information of the WiFi terminal carried in this WiFi signal. In the above application scenario, as shown in FIG. 3, the method for determining track information of a target person specifically includes the following steps.

In step 301, image acquisition devices capture and output videos.

In step 302, WiFi detectors detect unique identification information of WiFi terminals within their detection areas and output a correspondence relationship between the detected unique identification information and the detection moment of the unique identification information. There are no sequential relationships between step 301 and step 302.

In step 303, a processing server obtains a plurality of designated videos that contain a target person based on the videos; and determines a plurality of first image acquisition devices shot the designated videos.

In step 304, the processing server, according to a preset intersection mode and for at least two first image acquisition devices among the plurality of first image acquisition devices, obtains appearance moments of the target person in the designated videos respectively, determines a detection time interval containing these appearance moments respectively, obtains sets of unique identification information of WiFi terminals detected by the WiFi detectors of the first image acquisition devices during the detection time interval respectively based on a correspondence relationship between the unique identification information and the detection moment of the unique identification information, and performs an intersection processing on the obtained sets of unique identification information of the WiFi terminals to obtain an intersection set of unique identification information.

In step 305, the processing server determines the unique identification information of the WiFi terminal in the intersection set of unique identification information as unique identification information of the target person.

In step 306, the processing server obtains image acquisition devices in which all WiFi detectors detected the unique identification information of the target person are located, and determines the track information of the target person based on locations of the image acquisition devices in which all the WiFi detectors are detected.

In embodiments of the present application, the image acquisition devices, when outputting videos, directly output these videos to the processing server. The processing server directly obtains a plurality of designated videos that contain the target person from this processing server based on the videos output by the image acquisition devices to this processing server. Alternatively, the system can further include a video memory. The image acquisition devices, when outputting videos, output these videos to the video memory. The video memory receives the videos from the image acquisition devices and stores these videos in a local storage medium. The processing server obtains a plurality of designated videos that contain the target person from the video memory based on the videos output by the image acquisition devices to the video memory.

In embodiments of the present application, the WiFi detectors, when outputting a correspondence relationship between the detected unique identification information and the detection moment of the unique identification information, directly output the correspondence relationship between the detected unique identification information and the detection moment of the unique identification information to the processing server. The processing server directly obtains a correspondence relationship between the unique identification information and the detection moment of the unique identification information from this processing server based on the correspondence relationship, output by WiFi detectors to this processing server, between the unique identification information and the detection moment of the unique identification information, and obtains sets of unique identification information of WiFi terminals detected by the WiFi detectors during the detection time interval based on this correspondence relationship. Alternatively, the system can further include an identification memory. The WiFi detectors, when outputting a correspondence relationship between the detected unique identification information and the detection moment of the unique identification information, output the correspondence relationship between the unique identification information and the detection moment of the unique identification information to the identification memory. The identification memory receives and stores the correspondence relationship between the unique identification information and the detection moment of the unique identification information from the WiFi detectors. The processing server directly obtains a correspondence relationship between the unique identification information and the detection moment of the unique identification information from the identification memory based on the correspondence relationship, output by WiFi detectors to the identification memory, between the unique identification information and the detection moment of the unique identification information, and obtains sets of unique identification information of WiFi terminals detected by the WiFi detectors during the detection time interval based on this correspondence relationship.

In embodiments of the present application, a video memory and an identification memory can be deployed in one device, and can also be deployed in different devices.

In embodiments of the present application, a user can know which videos contain a target person, and designate information of the videos containing the target person to a processing server, the processing server can obtain a plurality of designated videos containing the target person based on the information of the videos containing the target person designated by the user. The user only needs to select a part of videos from all videos containing the target person, and designate a plurality of videos of this part containing the target person to the processing server. For example, when a user designates a video 1, a video 2, a video 3 and a video 4 that contain a target person to a processing server, videos containing the target person obtained by the processing server are the video 1, the video 2, the video 3 and the video 4. Further, when image acquisition devices output videos, they can also output a correspondence relationship between the identifications of the image acquisition devices and these videos, such that the processing server can know various first image acquisition devices corresponding to various videos containing a target person. For example, the processing server knows a first image acquisition device 1 corresponding to the video 1, a first image acquisition device 2 corresponding to the video 2, a first image acquisition device 3 corresponding to the video 3, a first image acquisition device 4 corresponding to the video 4.

In embodiments of the present application, the processing server, according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively based on the correspondence relationship, output by the WiFi detectors, between the unique identification information and the detection moment of the unique identification information, and performing an intersection processing on the obtained sets of unique identification information of the WiFi terminals to obtain an intersection set of the unique identification information, can specifically include but is not limited to the following two cases:

case 1: the processing server, when the preset intersection mode is to get an intersection set of all sets, for all first image acquisition devices of the plurality of first image acquisition devices (a plurality of first image acquisition devices corresponding to a plurality of designated videos containing the target person): obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the sets of unique identification information of the WiFi terminals respectively obtained by all first image acquisition devices among the plurality of first image acquisition devices, so as to obtain an intersection set of the unique identification information;

case 2, when the preset intersection mode is to get an intersection set cyclically, the processing server performs the following steps:

step A, selecting two first image acquisition devices from the plurality of first image acquisition devices (a plurality of first image acquisition devices corresponding to a plurality of designated videos containing the target person), obtaining appearance moments of the target person in the designated videos respectively, determining a detection time interval containing these appearance moments respectively, and obtaining sets of unique identification information of WiFi terminals detected by the WiFi detectors of the first image acquisition devices during the detection time interval respectively;

step B, performing an intersection processing on the sets of unique identification information of the WiFi terminals respectively obtained by the two first image acquisition devices among the plurality of first image acquisition devices, so as to obtain a first intersection set of unique identification information;

step C, judging whether the number of pieces of the unique identification information of the WiFi terminals in the first intersection set of unique identification information equals to 1; if so, determining this first intersection set of unique identification information as a final intersection set of unique identification information, and ending this flow; otherwise, performing step D;

step D, selecting one unselected first image acquisition device from the plurality of first image acquisition devices, obtaining appearance moments of the target person in the designated videos, determining a detection time interval containing these appearance moments, obtaining a set of unique identification information of the WiFi terminals detected by the WiFi detector of the first image acquisition device during the detection time interval;

step E, performing an intersection processing on the set of unique identification information of the WiFi terminals obtained by this first image acquisition device and the first intersection set of unique identification information, and judging whether the number of pieces of the unique identification information of the WiFi terminal in the intersection set obtained after the intersection processing equals to 1; if so, determining the intersection set obtained after the intersection processing as the final intersection set of unique identification information; otherwise, determining the intersection set obtained after the intersection processing as the first intersection set of unique identification information, and performing step D.

In embodiments of the present application, since videos contain a target person, a processing server can directly determine appearance moments of the target person in these videos. After determining the appearance moments of the target person in the videos, the processing server can further determine a detection time interval containing these appearance moments. The detection time interval can specifically be from the appearance moment to a sum of the appearance moment and a first value, or from a difference of the appearance moment and a second value to the appearance moment, or from a difference of the appearance moment and a third value to a sum of the appearance moment and a fourth value. In actual applications, all of the first, second, third and fourth values can be arbitrarily selected according to actual experience. For example, when an error between the detection moment and the appearance moment allowable in actual applications is no larger than one second, the detection time interval can be from a difference of the appearance moment and one second to a sum of the appearance moment and one second. For example, when the appearance moment is 17:30:00 on May 28, 2015, a corresponding detection time interval is from 17:29:59 on May 28, 2015 to 17:30:01 on May 28, 2015.

In embodiments of the present application, a processing server can obtain sets of unique identification information of WiFi terminals detected by WiFi detectors of first image acquisition devices during a detection time interval based on a correspondence relationship between the unique identification information output by the WiFi detectors of the first image acquisition devices and the detection moments of the unique identification information. For example, a processing server can know whether a detection moment of each piece of unique identification information output by a WiFi detector 1 is located within a detection time interval based on a correspondence relationship between the unique identification information output by the WiFi detector 1 of a first image acquisition device 1 and the detection moment of the unique identification information as well as the detection time interval; if it is located within the detection time interval, a set of unique identification information contain this piece of unique identification information; otherwise, the set of unique identification information does not contain this piece of unique identification information.

For case 1, when a plurality of first image acquisition devices are first image acquisition devices 1, 2, 3 and 4 respectively, a set 1 of unique identification information of WiFi terminals detected by a WiFi detector of the first image acquisition device 1 during a detection time interval, a set 2 of unique identification information of WiFi terminals detected by a WiFi detector of the first image acquisition device 2 during the detection time interval, a set 3 of unique identification information of WiFi terminals detected by a WiFi detector of the first image acquisition device 3 during the detection time interval, a set 4 of unique identification information of WiFi terminals detected by a WiFi detector of the first image acquisition device 4 during the detection time interval are obtained respectively, and performing an intersection processing on the sets 1, 2, 3 and 4 so as to obtain a intersection set of unique identification information.

For case 2, when a plurality of first image acquisition devices are first image acquisition devices 1, 2, 3 and 4 respectively, a set 1 of unique identification information of WiFi terminals detected by a WiFi detector of the first image acquisition device 1 during a detection time interval, a set 2 of unique identification information of WiFi terminals detected by a WiFi detector of the first image acquisition device 2 during the detection time interval are obtained respectively, and performing an intersection processing on the sets 1, 2 so as to obtain a first intersection set of unique identification information. If the number of pieces of the unique identification information of WiFi terminals in the first intersection set of unique identification information equals to 1, the first intersection set of unique identification information is determined as a final intersection set of unique identification information. If the number of pieces of the unique identification information of WiFi terminals in the first intersection set of unique identification information does not equal to 1, a set 3 of unique identification information of WiFi terminals detected by a WiFi detector of the first image acquisition device 3 is obtained during the detection time interval, and an intersection processing is performed on the set 3 and the first intersection set of unique identification information, if the number of pieces of the unique identification information of WiFi terminals in the intersection set obtained after the intersection processing equals to 1, determining the intersection set obtained after the intersection processing as a final intersection set of unique identification information; if the number of pieces of the unique identification information of WiFi terminals in the intersection set obtained after the intersection processing does not equal to 1, determining the intersection set obtained after the intersection processing as the first intersection set of unique identification information, and so on.

In embodiments of the present application, a processing server can obtain image acquisition devices in which all WiFi detectors detected unique identification information of the target person are located based on a correspondence relationship between the unique identification information and the detection moment of the unique identification information output by all WiFi detectors, and determine track information of the target person based on locations of image acquisition devices in which all the WiFi detectors are detected. For example, when the correspondence relationship between unique identification information and the detection moment of the unique identification information output by WiFi detectors 1 to 15 includes the unique identification information 1 of a target person, a processing server can obtain that all WiFi detectors which can detect the unique identification information 1 are WiFi detectors 1 to 15, and determine the track information of the target person based on the locations of image acquisition devices where WiFi detectors 1 to 15 are located.

In a specific application, the track information of a target person determined by a processing server based on a correspondence relationship between the unique identification information and the detection moment of the unique identification information output by WiFi detectors is initial track information, which can be corrected subsequently so as to obtain final track information. When correcting the initial track information, it is possible to determine an initial WiFi detector and a terminated WiFi detector for the track, determine a first detection moment when the initial WiFi detector detects unique identification information of a target person, and determine a second detection moment when the terminated WiFi detector detects the unique identification information of the target person. For other WiFi detectors in the initial track information, if detection moments when other WiFi detectors detect the unique identification information of the target person are between the first detection moment and the second detection moment, locations of image acquisition devices where other WiFi detectors are located are reserved in the final track information; otherwise, the locations of image acquisition devices where other WiFi detectors are located are deleted from the final track information. The final track information can be obtained after performing the above processing on each of other WiFi detectors. The initial WiFi detector and the terminated WiFi detector for the track can be decided by users.

Based on the above technical solutions, compared to the prior art, embodiments of the present application at least have the following advantages: in the embodiments of the present application, by associating information output by video monitors and information output by WiFi detectors, it is possible to determine unique identification information of a target person based on a plurality of designated videos containing the target person (i.e., a part of videos among all videos containing the target person, which can be designated by users), obtain image acquisition devices in which all WiFi detectors detected the unique identification information of the target person are located, and determine the track information of the target person based on locations of the image acquisition devices in which all the WiFi detectors are detected. In the above solution, track information of a target person can be obtained after simply obtaining only a small number of videos containing the target person without analyzing a large number of videos, eliminating analysis processes on a large number of videos.

The Third Embodiment

Figure 4:
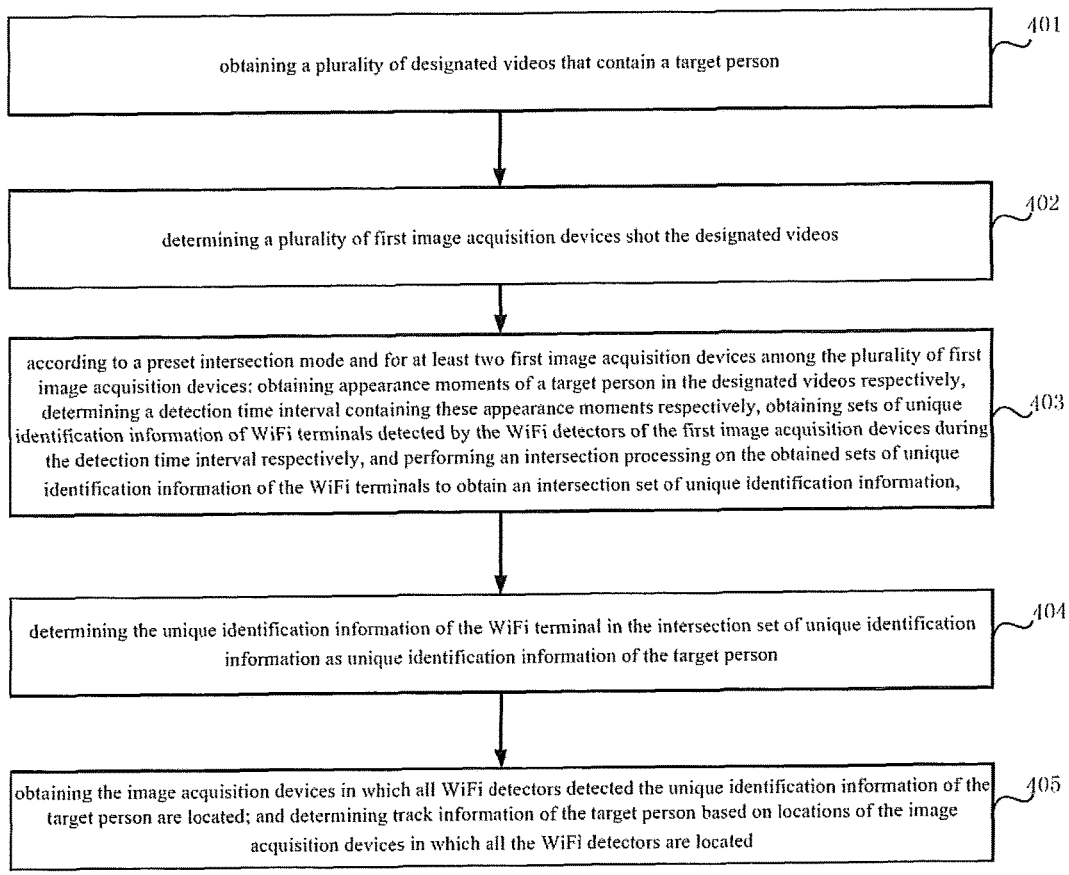
FIG. 4 is a schematic flowchart of a method for determining track information of a target person presented in a third embodiment of the present application.

Based on the same inventive concept as the above system, the third embodiment of the present application proposes a method for determining track information of a target person, the method is applicable to a processing server which is connected with a plurality of image acquisition devices. The processing server is connected with a plurality of image acquisition devices in a wired mode or in a wireless mode. Each image acquisition device contains a WiFi detector and an image capturing module (e.g., an intelligent traffic camera with an image capturing function) therein. The image acquisition device captures videos via the image capturing module. The WiFi detector can be a WiFi detector built in an image acquisition device, and can also be a WiFi detector deployed separately from an image acquisition device. For ease of description, a WiFi detector built in an image acquisition device is taken as an example. Based on this WiFi detector, an image acquisition device, after receiving a WiFi signal (which can be a broadcast message) from a WiFi terminal, can parse out unique identification information of the WiFi terminal from this WiFi signal, and the unique identification information of the WiFi terminal specifically including but not limited to a MAC address of the WiFi terminal. Further, based on this WiFi detector, the image acquisition device, after receiving a WiFi signal from a WiFi terminal, may not response to the WiFi terminal and not provide WiFi services for the WiFi terminal, as long as it can parse out the unique identification information of the WiFi terminal carried in this WiFi signal. In the above application scenario, as shown in FIG. 4, the method for determining track information of a target person can specifically include the following steps.

In step 401, a processing server obtains a plurality of designated videos that contain a target person.

A user can know which videos contain a target person, and designate information of the videos containing the target person to a processing server, the processing server can obtain a plurality of designated videos containing the target person based on the information of the videos containing the target person designated by the user. The user only needs to select a part of videos from all videos containing the target person, and designate a plurality of videos of this part containing the target person to the processing server. For example, when a user designates a video 1, a video 2, a video 3 and a video 4 that contain a target person to a processing server, videos containing the target person obtained by the processing server are the video 1, the video 2, the video 3 and the video 4.

In step 402, the processing server determines a plurality of first image acquisition devices shot the designated videos.

When image acquisition devices output videos, they can also output a correspondence relationship between the identifications of the image acquisition devices and these videos, such that the processing server can know various first image acquisition devices corresponding to various videos containing a target person. For example, for videos 1, 2, 3 and 4, the processing server knows a first image acquisition device 1 corresponding to the video 1, a first image acquisition device 2 corresponding to the video 2, a first image acquisition device 3 corresponding to the video 3, a first image acquisition device 4 corresponding to the video 4.

In step 403, the processing server, according to a preset intersection mode and for at least two first image acquisition devices among the plurality of first image acquisition devices, obtains appearance moments of the target person in the designated videos respectively, determines a detection time interval containing these appearance moments respectively, obtains sets of unique identification information of WiFi terminals detected by the WiFi detectors of the first image acquisition devices during the detection time interval respectively, and performs an intersection processing on the obtained sets of unique identification information of the WiFi terminals to obtain an intersection set of unique identification information.

In embodiments of the present application, the step 403 can specifically include but is not limited to the following two cases:

case 1: the processing server, when the preset intersection mode is to get an intersection set of all sets, for all first image acquisition devices of the plurality of first image acquisition devices (a plurality of first image acquisition devices corresponding to a plurality of designated videos containing the target person): obtaining appearance moments of the target person in the designated videos respectively, determining detection time interval containing these appearance moments respectively, obtaining sets of unique identification information of WiFi terminals detected by the WiFi detectors of the first image acquisition devices during the detection time interval respectively, and performing an intersection processing on the sets of unique identification information of the WiFi terminals respectively obtained by all first image acquisition devices among the plurality of first image acquisition devices, so as to obtain an intersection set of the unique identification information;

case 2, when the preset intersection mode is to get an intersection set cyclically, the processing server performs the following steps:

step A, selecting two first image acquisition devices from the plurality of first image acquisition devices (a plurality of first image acquisition devices corresponding to a plurality of designated videos containing the target person), obtaining appearance moments of the target person in the designated videos respectively, determining a detection time interval containing these appearance moments respectively, and obtaining sets of unique identification information of WiFi terminals detected by the WiFi detectors of the first image acquisition devices during the detection time interval respectively;

step B, performing an intersection processing on the sets of unique identification information of the WiFi terminals respectively obtained by the two first image acquisition devices among the plurality of first image acquisition devices, so as to obtain a first intersection set of unique identification information;

step C, judging whether the number of pieces of the unique identification information of the WiFi terminals in the first intersection set of unique identification information equals to 1; if so, determining this first intersection set of unique identification information as a final intersection set of unique identification information, and ending this flow; otherwise, performing step D;

step D, selecting one unselected first image acquisition device from the plurality of first image acquisition devices, obtaining appearance moments of the target person in the designated videos, determining a detection time interval containing these appearance moments, obtaining a set of unique identification information of the WiFi terminals detected by the WiFi detector of the first image acquisition device during the detection time interval;

step E, performing an intersection processing on the set of unique identification information of the WiFi terminals obtained by this first image acquisition device and the first intersection set of unique identification information, and judging whether the number of pieces of the unique identification information of the WiFi terminals in the intersection set obtained after the intersection processing equals to 1; if so, determining the intersection set obtained after the intersection processing as the final intersection set of unique identification information; otherwise, determining the intersection set obtained after the intersection processing as the first intersection set of unique identification information, and performing step D.

In embodiments of the present application, since videos contain a target person, a processing server can directly determine appearance moments of the target person in these videos. After determining the appearance moments of the target person in the videos, the processing server can further determine a detection time interval containing these appearance moments. The detection time interval can specifically be from the appearance moment to a sum of the appearance moment and a first value, or from a difference of the appearance moment and a second value to the appearance moment, or from a difference of the appearance moment and a third value to a sum of the appearance moment and a fourth value. In actual applications, all of the first, second, third and fourth values can be arbitrarily selected according to actual experience. For example, when an error between the detection moment and the appearance moment allowable in actual applications is no larger than one second, the detection time interval can be from a difference of the appearance moment and one second to a sum of the appearance moment and one second. For example, when the appearance moment is 17:30:00 on May 28, 2015, a corresponding detection time interval is from 17:29:59 on May 28, 2015 to 17:30:01 on May 28, 2015.

In embodiments of the present application, a processing server can obtain sets of unique identification information of WiFi terminals detected by WiFi detectors of first image acquisition devices during a detection time interval based on a correspondence relationship between the unique identification information output by the WiFi detectors of the first image acquisition devices and the detection moments of the unique identification information. For example, a processing server can know whether a detection moment of each piece of unique identification information output by a WiFi detector 1 is located within a detection time interval based on a correspondence relationship between the unique identification information output by the WiFi detector 1 of a first image acquisition device 1 and the detection moment of the unique identification information as well as the detection time interval; if it is located within the detection time interval, a set of unique identification information contain this piece of unique identification information; otherwise, the set of unique identification information does not contain this piece of unique identification information.

For case 1, when a plurality of first image acquisition devices are first image acquisition devices 1, 2, 3 and 4 respectively, a set 1 of unique identification information of WiFi terminals detected by a WiFi detector of the first image acquisition device 1 during a detection time interval, a set 2 of unique identification information of WiFi terminals detected by a WiFi detector of the first image acquisition device 2 during the detection time interval, a set 3 of unique identification information of WiFi terminals detected by a WiFi detector of the first image acquisition device 3 during the detection time interval, a set 4 of unique identification information of WiFi terminals detected by a WiFi detector of the first image acquisition device 4 during the detection time interval are obtained respectively, and performing an intersection processing on the sets 1, 2, 3 and 4 so as to obtain a intersection set of unique identification information.

For case 2, when a plurality of first image acquisition devices are first image acquisition devices 1, 2, 3 and 4 respectively, a set 1 of unique identification information of WiFi terminals detected by a WiFi detector of the first image acquisition device 1 during a detection time interval, a set 2 of unique identification information of WiFi terminals detected by a WiFi detector of the first image acquisition device 2 during the detection time interval are obtained respectively, and performing an intersection processing on the sets 1, 2 so as to obtain a first intersection set of unique identification information. If the number of pieces of the unique identification information of the WiFi terminal in the first intersection set of unique identification information equals to 1, the first intersection set of unique identification information is determined as a final intersection set of unique identification information. If the number of pieces of the unique identification information of WiFi terminals in the first intersection set of unique identification information does not equal to 1, a set 3 of unique identification information of WiFi terminals detected by a WiFi detector of the first image acquisition device 3 is obtained during the detection time interval, and an intersection processing is performed on the set 3 and the first intersection set of unique identification information, if the number of pieces of the unique identification information of WiFi terminals in the intersection set obtained after the intersection processing equals to 1, determining the intersection set obtained after the intersection processing as a final intersection set of unique identification information; if the number of pieces of the unique identification information of WiFi terminals in the intersection set obtained after the intersection processing does not equal to 1, determining the intersection set obtained after the intersection processing as the first intersection set of unique identification information, and so on.

In step 404, the processing server determines the unique identification information of WiFi terminals in the intersection set of unique identification information as unique identification information of the target person.

In step 405, the processing server obtains image acquisition devices in which all WiFi detectors detected the unique identification information of the target person are located; and determines the track information of the target person based on locations of the image acquisition devices in which all the WiFi detectors are detected.

In embodiments of the present application, a processing server can obtain image acquisition devices in which all WiFi detectors detected unique identification information of the target person are located based on a correspondence relationship between the unique identification information and the detection moment of the unique identification information output by all WiFi detectors, and determine track information of the target person based on locations of image acquisition devices in which all the WiFi detectors are detected. For example, when the correspondence relationship between unique identification information and the detection moment of the unique identification information output by WiFi detectors 1 to 15 includes the unique identification information 1 of a target person, a processing server can obtain that all WiFi detectors which can detect the unique identification information 1 are WiFi detectors 1 to 15, and determine the track information of the target person based on the locations of image acquisition devices where Win detectors 1 to 15 are located.

In a specific application, the track information of a target person determined by a processing server based on a correspondence relationship between the unique identification information and the detection moment of the unique identification information output by WiFi detectors is initial track information, which can be corrected subsequently so as to obtain final track information. When correcting the initial track information, it is possible to determine an initial WiFi detector and a terminated WiFi detector for the track, determine a first detection moment when the initial WiFi detector detects unique identification information of a target person, and determine a second detection moment when the terminated WiFi detector detects the unique identification information of the target person. For other WiFi detectors in the initial track information, if detection moments when other WiFi detectors detect the unique identification information of the target person are between the first detection moment and the second detection moment, locations of image acquisition devices where other WiFi detectors are located are reserved in the final track information; otherwise, the locations of image acquisition devices where other WiFi detectors are located are deleted from the final track information. The final track information can be obtained after performing the above processing on each of other WiFi detectors. The initial WiFi detector and the terminated WiFi detector for the track can be decided by users.

Based on the above technical solutions, compared to the prior art, embodiments of the present application at least have the following advantages: in the embodiments of the present application, by associating information output by video monitors and information output by WiFi detectors, it is possible to determine unique identification information of a target person based on a plurality of designated videos containing the target person (i.e., a part of videos among all videos containing the target person, which can be designated by users), obtain image acquisition devices in which all WiFi detectors detected the unique identification information of the target person are located, and determine the track information of the target person based on locations of the image acquisition devices in which all the WiFi detectors are detected. In the above solution, track information of a target person can be obtained after simply obtaining only a small number of videos containing the target person without analyzing a large number of videos, eliminating analysis processes on a large number of videos.

The Fourth Embodiment

Figure 5:
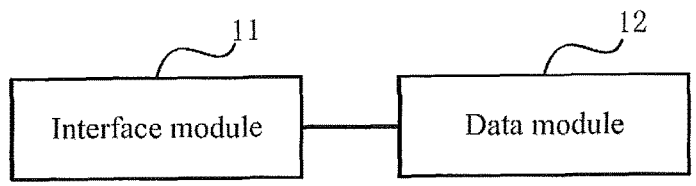
FIG. 5 is a schematic structural diagram of a processing server presented in a fourth embodiment of the present application.

Based on the same inventive concept as the above system, the fourth embodiment of the present application proposes a processing server, which is connected with a plurality of image acquisition devices including wireless fidelity WiFi detectors, wherein, the processing server is connected with a plurality of image acquisition devices in a wired mode or in a wireless mode. As shown in FIG. 5, the processing server specifically includes:

an interface module 11, used for obtaining a plurality of designated videos that contain a target person and obtaining a correspondence relationship between unique identification information and the detection moment of the unique identification information output by the WiFi detectors.

The interface module can specifically be a data transceiver with reception and transmission capabilities. The interface module can interact with a device capable of providing videos containing a target person in a wired mode or in a wireless mode. For example, when an image acquisition device outputs videos to a processing server, the interface module interacts with the image acquisition device in a wired mode or in a wireless mode; when an image acquisition device outputs videos to a video memory, the interface module interacts with the video memory in a wired mode or in a wireless mode. Besides, the interface module can interact with a device capable of providing a correspondence relationship between unique identification information and the detection moment of the unique identification information in a wired mode or in a wireless mode. For example, when a WiFi detector outputs a correspondence relationship between unique identification information and the detection moment of the unique identification information to a processing server, the interface module interacts with the WiFi detector in a wired mode or in a wireless mode. When a WiFi detector outputs a correspondence relationship between unique identification information and the detection moment of the unique identification information to an identification memory, the interface module interacts with the identification memory in a wired mode or in a wireless mode.

The processing server 12 is used for determining a plurality of first image acquisition devices shot the designated videos, according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information;

determining the unique identification information of the WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected.

The data processor can specifically be a CPU (central processing unit) with a data processing capability.

The processing server 12 is specifically used for, when the preset intersection mode is to get an intersection set of all sets, for all first image acquisition devices among the plurality of first image acquisition devices: obtaining appearance moments of the target person in the designated videos respectively, determining detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information.

The data processor 12 is specifically used for, when the preset intersection mode is to get an intersection set cyclically, A, selecting two first image acquisition devices from the plurality of first image acquisition devices, obtaining appearance moments of the target person in the designated videos respectively, determining a detection time interval containing these appearance moments respectively, and obtaining sets of unique identification information of WiFi terminals detected by the WiFi detectors of the first image acquisition devices during the detection time interval respectively;

B, performing an intersection processing on the sets of unique identification information of the WiFi terminals respectively obtained by the two first image acquisition devices among the plurality of first image acquisition devices, so as to obtain a first intersection set of unique identification information;

C, judging whether the number of pieces of the unique identification information of the WiFi terminal in the first intersection set of unique identification information equals to 1; if so, determining the first intersection set of unique identification information as a final intersection set of unique identification information and ending this flow; otherwise, performing step D;

D, selecting one unselected first image acquisition device from the plurality of first image acquisition devices, obtaining appearance moments of the target person in the designated video, determining a detection time interval containing these appearance moments, obtaining a set of unique identification information of the WiFi terminals detected by a WiFi detector of this first image acquisition device during the detection time interval;

E, performing an intersection processing on the set of unique identification information of the WiFi terminals obtained by the first image acquisition device and the obtained first intersection set of unique identification information, and judging whether the number of pieces of the unique identification information of the WiFi terminal in the intersection set obtained after the intersection processing equals to 1; if so, determining the intersection set obtained after the intersection processing as a final intersection set of unique identification information; otherwise, determining the intersection set obtained after the intersection processing as the first intersection set of unique identification information, and performing D.

In embodiments of the present application, the unique identification information of the WiFi terminal specifically includes a Media Access Control MAC address of the WiFi terminal.

Various modules of the device in the present application can be integrated into a whole or can be separately deployed. The modules described above can be combined into one module, or can be further split into a plurality of submodules.

Embodiments of the present application provide an application program, which is used for performing the method for determining track information of a target person provided by embodiments of the present application when in operation.

In a specific implementation of the present application, the method for determining track information of a target person described above is applicable to a processing server, which is connected with a plurality of image acquisition devices including wireless fidelity WiFi detectors;

the method includes:

obtaining a plurality of designated videos that contain a target person;

determining a plurality of first image acquisition devices shot the designated videos;

according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information;

determining the unique identification information of the WiFi terminal in the intersection set of unique identification information as unique identification information of the target person;

obtaining image acquisition devices in which all WiFi detectors detected the unique identification information of the target person are located;

determining track information of the target person based on locations of the image acquisition devices in which all the WiFi detectors are detected.

In a specific implementation of the present application, the method for determining track information of a target person described above is applicable to a system which including a processing server and a plurality of image acquisition devices connected with the processing server, and the image acquisition devices contain wireless fidelity WiFi detectors therein; the method includes:

capturing and outputting videos by image acquisition devices;

detecting unique identification information of WiFi terminals by WiFi detectors within their detection areas and outputting a correspondence relationship between the detected unique identification information and the detection moment of the unique identification information;

obtaining a plurality of designated videos that contain a target person by the processing server based on the videos; determining a plurality of first image acquisition devices shot the designated videos; according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively based on the correspondence relationships between the unique identification information and the detection moments of the unique identification information, and performing an intersection processing on the obtained sets of unique identification information of the WiFi terminals to obtain an intersection set of unique identification information; determining the unique identification information of the WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected.

Embodiments of the present application provide a storage medium, which is used to store an application program for performing the method for determining track information of a target person provided by embodiments of the present application.

In a specific implementation of the present application, the method for determining track information of a target person described above is applicable to a processing server, which is connected with a plurality of image acquisition devices including wireless fidelity WiFi detectors;

the method includes:
obtaining a plurality of designated videos that contain a target person;

determining a plurality of first image acquisition devices shot the designated videos;

according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information;

determining the unique identification information of the WiFi terminal in the intersection set of unique identification information as unique identification information of the target person;

obtaining image acquisition devices in which all WiFi detectors detected the unique identification information of the target person are located;

determining track information of the target person based on locations of the image acquisition devices in which all the WiFi detectors are detected.

In a specific implementation of the present application, the method for determining track information of a target person described above is applicable to a system which including a processing server and a plurality of image acquisition devices connected with the processing server, and the image acquisition devices contain wireless fidelity WiFi detectors therein; the method includes:

capturing and outputting videos by image acquisition devices;

detecting unique identification information of WiFi terminals by WiFi detectors within their detection areas and outputting a correspondence relationship between the detected unique identification information and the detection moment of the unique identification information;

obtaining a plurality of designated videos that contain a target person by the processing server based on the videos; determining a plurality of first image acquisition devices shot the designated videos; according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively based on the correspondence relationships between the unique identification information and the detection moments of the unique identification information, and performing an intersection processing on the obtained sets of unique identification information of the WiFi terminals to obtain an intersection set of unique identification information; determining the unique identification information of the WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected.

The embodiments of a processing server, a system, an application program and a storage medium are described briefly since they are substantially similar to the method embodiment. Related contents can refer to the description of the method embodiment.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices including a series of elements include not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which including the listed elements.

All embodiments in the description are described in a correlated manner, and identical or similar parts in various embodiments can be referred to one another, the description for each embodiment all focuses on the differences with other embodiments. Especially, the system embodiment is described briefly since it is substantially similar to the method embodiment, and related contents can refer to the description of the method embodiment.

The embodiments described above are just preferable embodiments of the present application, and not indented to limit the present application. Any modifications, alternatives, improvements or the like within the spirit and principle of the present application shall be included in the protection scope of the present application.

The invention claimed is:

1. A method for determining track information of a target person, which is applicable to a processing server, wherein the processing server is connected with a plurality of image acquisition devices comprising wireless fidelity WiFi detectors;

the method comprises:
  obtaining a plurality of designated videos that contain the target person;
  determining a plurality of first image acquisition devices shot the designated videos;
  according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information;
  determining the unique identification information of a WiFi terminal in the intersection set of unique identification information as unique identification information of the target person;
  obtaining image acquisition devices in which all WiFi detectors detected the unique identification information of the target person are located detected the unique identification information of the target person are located;
  determining track information of the target person based on locations of the image acquisition devices in which all the WiFi detectors are located.

2. The method according to claim 1, wherein, when the preset intersection mode is to get an intersection set of all sets, the process of according to the preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information, specifically comprises:
  for all first image acquisition devices among the plurality of first image acquisition devices: obtaining the appearance moments of the target person in the designated videos respectively, determining a detection time interval containing these appearance moments respectively, and obtaining sets of unique identification information of WiFi terminals detected by the WiFi detectors of the first image acquisition devices during the detection time interval respectively;
  performing an intersection processing on the obtained sets of unique identification information of the WiFi terminals respectively obtained by all first image acquisition devices among the plurality of first image acquisition devices, so as to obtain an intersection set of unique identification information.

3. The method according to claim 1, wherein, when the preset intersection mode is to get an intersection set cyclically, the process of according to the preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information, specifically comprises:
  step A, selecting two first image acquisition devices from the plurality of first image acquisition devices, obtaining appearance moments of the target person in the designated videos respectively, determining a detection time interval containing these appearance moments respectively, and obtaining sets of unique identification information of WiFi terminals detected by the WiFi detectors of the first image acquisition devices during the detection time interval respectively;
  step B, performing an intersection processing on the obtained sets of unique identification information of the WiFi terminals respectively obtained by the two first image acquisition devices among the plurality of first image acquisition devices, so as to obtain a first intersection set of unique identification information;

step C, judging whether the number of pieces of the unique identification information of the WiFi terminal in the first intersection set of unique identification information equals to 1; if so, determining the first intersection set of unique identification information as a final intersection set of unique identification information and ending this flow; otherwise, performing step D;

step D, selecting one unselected first image acquisition device from the plurality of first image acquisition devices, obtaining the appearance moments of the target person in the designated videos, determining a detection time interval containing these appearance moments, and obtaining a set of unique identification information of WiFi terminals detected by a WiFi detector of this first image acquisition device during the detection time interval;

step E, performing an intersection processing on the set of unique identification information of WiFi terminals obtained by the first image acquisition device and the obtained first intersection set of unique identification information, and judging whether the number of pieces of the unique identification information of the WiFi terminal in an intersection set obtained after the intersection processing equals to 1; if so, determining the intersection set obtained after the intersection processing as a final intersection set of unique identification information; otherwise, determining the intersection set obtained after the intersection processing as the first intersection set of unique identification information, and performing step D.

4. The method according to claim 1, wherein, the unique identification information of the WiFi terminal specifically comprises a Media Access Control MAC address of the WiFi terminal.

5. A processing server, which is connected with a plurality of image acquisition devices comprising wireless fidelity WiFi detectors, wherein the processing server specifically comprises:
an interface module, used for obtaining a plurality of designated videos that contain a target person;
a data processor, used for determining a plurality of first image acquisition devices shot the designated videos; according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information;
determining the unique identification information of a WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected.

6. The processing server according to claim 5, wherein, the data processor is specifically used for, when the preset intersection mode is to get an intersection set of all sets, for all first image acquisition devices of the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the sets of unique identification information of the WiFi terminals obtained by all first image acquisition devices among the plurality of first image acquisition devices, so as to obtain an intersection set of unique identification information.

7. The processing server according to claim 5, wherein, the data processor is specifically used for, when the preset intersection mode is to get an intersection set cyclically,
A, selecting two first image acquisition devices from the plurality of first image acquisition devices, obtaining appearance moments of the target person in the designated videos respectively, determining a detection time interval containing these appearance moments respectively, and obtaining sets of unique identification information of WiFi terminals detected by the WiFi detectors of the first image acquisition devices during the detection time interval respectively;
B, performing an intersection processing on the sets of unique identification information of the WiFi terminals respectively obtained by the two first image acquisition devices among the plurality of first image acquisition devices, so as to obtain a first intersection set of unique identification information;
C, judging whether the number of pieces of the unique identification information of a WiFi terminal in the first intersection set of unique identification information equals to 1; if so, determining the first intersection set of unique identification information as a final intersection set of unique identification information and ending this flow; otherwise, performing step D;
D, selecting one unselected first image acquisition device from the plurality of first image acquisition devices, obtaining appearance moments of the target person in the designated videos, determining a detection time interval containing these appearance moments, and obtaining a set of unique identification information of WiFi terminals detected by a WiFi detector of this first image acquisition device during the detection time interval;
E, performing an intersection processing on the obtained set of unique identification information of the WiFi terminals obtained by the first image acquisition device and the obtained first intersection set of unique identification information, and judging whether the number of pieces of the unique identification information of a WiFi terminal in an intersection set obtained after the intersection processing equals to 1; if so, determining the intersection set obtained after the intersection processing as a final intersection set of unique identification information; otherwise, determining the intersection set obtained after the intersection processing as the first intersection set of unique identification information, and performing D.

8. The processing server according to claim 5, wherein, the unique identification information of the WiFi terminal specifically comprises a Media Access Control MAC address of the WiFi terminal.

9. A system for determining track information of a target person, wherein the system specifically comprises a processing server and a plurality of image acquisition devices connected with the processing server, and the image acquisition devices comprise wireless fidelity WiFi detectors therein; wherein,
the image acquisition devices are used for capturing and outputting videos;
WiFi detectors are used for detecting unique identification information of WiFi terminals within their detection areas and outputting a correspondence relationship between the detected unique identification information and the detection moment of the unique identification information;
the processing server is used for obtaining a plurality of designated videos that contain a target person based on the videos; determining a plurality of first image acquisition devices shot the designated videos; according to a preset intersection mode and for at least two first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively based on the correspondence relationship between the unique identification information and the detection moment of the unique identification information, and performing an intersection processing on the obtained sets of unique identification information of the WiFi terminals to obtain an intersection set of unique identification information; determining the unique identification information of the WiFi terminal in the intersection set of unique identification information as unique identification information of the target person; obtaining image acquisition devices in which all WiFi detectors detected the unique identification information of the target person are located; determining track information of the target person based on locations of the image acquisition devices in which all the WiFi detectors are detected.

10. The system according to claim 9, wherein the system further comprises a video memory;
the image acquisition devices are specifically used for outputting the videos to the video memory;
the video memory is used for receiving and storing the videos from the image acquisition devices;
the processing server is used for obtaining a plurality of designated videos that contain the target person from the video memory.

11. The system according to claim 9, wherein the system further comprises an identification memory;
the WiFi detectors are specifically used for outputting a correspondence relationship between the unique identification information and the detection moment of the unique identification information to the identification memory;
the identification memory is used for receiving and storing the correspondence relationship between the unique identification information and the detection moment of the unique identification information from the WiFi detectors;
the processing server is specifically used for obtaining the correspondence relationship between the unique identification information and the detection moment of the unique identification information from the identification memory.

12. The system according to claim 9, wherein
the processing server is specifically used for, when the preset intersection mode is to get an intersection set of all sets, for all first image acquisition devices among the plurality of first image acquisition devices: obtaining appearance moments of the target person in the designated videos respectively, determining a detection time interval containing these appearance moments respectively, obtaining sets of unique identification information of WiFi terminals detected by the WiFi detectors of the first image acquisition devices during the detection time interval respectively, and performing an intersection processing on the obtained sets of unique identification information of the WiFi terminals to obtain an intersection set of unique identification information.

13. The system according to claim 9, wherein the processing server is specifically used for, when the preset intersection mode is to get an intersection set cyclically,
A, selecting two first image acquisition devices from the plurality of first image acquisition devices, obtaining appearance moments of the target person in the designated videos respectively, determining a detection time interval containing these appearance moments respectively, and obtaining sets of unique identification information of WiFi terminals detected by the WiFi detectors of the first image acquisition devices during the detection time interval respectively;
B, performing an intersection processing on the sets of unique identification information of the WiFi terminals respectively obtained by the two first image acquisition devices among the plurality of first image acquisition devices, so as to obtain a first intersection set of unique identification information;
C, judging whether the number of pieces of the unique identification information of the WiFi terminal in the first intersection set of unique identification information equals to 1; if so, determining the first intersection set of unique identification information as a final intersection set of unique identification information and ending this flow; otherwise, performing step D;
D, selecting one unselected first image acquisition device from the plurality of first image acquisition devices, obtaining appearance moments of the target person in the designated video, determining a detection time interval containing these appearance moments, and obtaining a set of unique identification information of WiFi terminals detected by a WiFi detector of this first image acquisition device during the detection time interval;
E, performing an intersection processing on the set of unique identification information of the WiFi terminals obtained by the first image acquisition device and the first intersection set of unique identification information, and judging whether the number of pieces of the unique identification information of the WiFi terminal in an intersection set obtained after the intersection processing equals to 1; if so, determining the intersection set obtained after the intersection processing as a final intersection set of unique identification information; otherwise, determining the intersection set obtained after the intersection processing as the first intersection set of unique identification information, and performing D.

14. A non-transitory storage medium, which is used for storing an application program, wherein the application program is used to perform the method for determining track information of a target person according to claim 1 when being executed.

* * * * *